United States Patent
Kovar

(10) Patent No.: US 8,941,666 B1
(45) Date of Patent: Jan. 27, 2015

(54) CHARACTER ANIMATION RECORDER

(75) Inventor: Lucas A. Kovar, San Francisco, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 979 days.

(21) Appl. No.: 13/070,611

(22) Filed: Mar. 24, 2011

(51) Int. Cl.
*G06T 13/00* (2011.01)
*G06T 11/00* (2006.01)
*G09G 5/00* (2006.01)
*G06F 3/00* (2006.01)
*G06F 9/44* (2006.01)

(52) U.S. Cl.
CPC ... *G06F 8/30* (2013.01); *G06F 8/34* (2013.01)
USPC ........... 345/474; 345/473; 345/619; 345/440; 345/427; 345/467; 345/468; 345/630; 345/469; 715/762

(58) Field of Classification Search
CPC ............. G06F 8/30; G06F 3/048; G06F 8/34; G06F 8/35; G05B 2219/23255; G06T 17/00; G06T 2213/12
USPC ......... 345/473, 474, 619, 440, 427, 467, 468, 345/630, 469, 951; 715/762
See application file for complete search history.

(56) References Cited

U.S. PATENT DOCUMENTS

2010/0134501 A1* 6/2010 Lowe et al. ................... 345/474

OTHER PUBLICATIONS

Rose, C., Cohen, M.F., and Bodenheimer, B. "Verbs and Adverbs: Multidimensional Motion Interpolation Using Radial Basis Functions". Computer Graphics and Applications, 2002.

* cited by examiner

*Primary Examiner* — Jeffrey Chow
(74) *Attorney, Agent, or Firm* — Kilpatrick Townsend & Stockton LLP

(57) ABSTRACT

A system includes a computing device that includes a memory configured to store instructions. The computing device also includes a processor configured to execute the instructions to perform a method that includes representing animation states of a virtual character in editable graphical representations. Each animation state represents each individual action of the character for an instance in time. The method also includes storing data that represents one or more changes in the animation states of the virtual character from the editable graphical representations. A pose of the virtual character is reconstructable upon retrieval of the stored data.

27 Claims, 6 Drawing Sheets

CHARACTER ANIMATION RECORDER

TECHNICAL FIELD

This document relates to recording the animation state of a character in a virtual environment such as a video game.

BACKGROUND

During game play, movements of video game characters are dynamically constructed based upon user commands, interactions with the virtual environment of the game and other types of input. To construct character poses to reflect such movements, a model of the character is typically utilized. Rather complicated, the character model may draw from numerous animation clips and other types of data to produce an appropriate pose. By using such a collection of data to produce character poses for rendering, if one or more of these final on-screen animations appears incorrect (e.g., the character moves in an awkward or unrealistic manner), identifying the source of the problem and correcting it can be a formidable challenge.

SUMMARY

The systems and techniques described here relate to representing the animation state of a character in a graphical structure that allows for easy review, editing, storage and reuse of the character animation state.

In one aspect, a computer-implemented method includes representing animation states of a virtual character in editable graphical representations. Each animation state represents each individual action of the character for an instance in time. The method also includes storing data that represents one or more changes in the animation states of the virtual character from the editable graphical representations. A pose of the virtual character is reconstructable upon retrieval of the stored data.

Implementations may include any or all of the following features. The method may further include comparing the editable graphical representations to determine the changes in the animation states of the virtual character. The animation states may represent actions performed by the virtual character at two or more time instances. The method may further include editing at least one of the editable graphical representations to change an action of the virtual character. The method may further include editing at least one of the editable graphical representations to add an action for the virtual character to perform. The editable graphical representations may be operator graphs. The editable graphical representations may include a hierarchical structure that includes nodes that represent individual actions of the virtual character. The animation states may represent actions of the virtual character in an interactive virtual environment, such as a video game.

In another aspect, a system includes a computing device that includes a memory configured to store instructions. The computing device also includes a processor configured to execute the instructions to perform a method that includes representing animation states of a virtual character in editable graphical representations. Each animation state represents each individual action of the character for an instance in time. The method also includes storing data that represents one or more changes in the animation states of the virtual character from the editable graphical representations. A pose of the virtual character is reconstructable upon retrieval of the stored data.

Implementations may include any or all of the following features. The processor may be configured to compare the editable graphical representations to determine the changes in the animation states of the virtual character. The animation states may represent actions performed by the virtual character at two or more time instances. The processor may be configured to edit at least one of the editable graphical representations to change an action of the virtual character. The processor may be configured to edit at least one of the editable graphical representations to add an action for the virtual character to perform. The editable graphical representations may be operator graphs. Each of the editable graphical representations may include a hierarchical structure that includes nodes that represent individual actions of the virtual character. The animation states may represent actions of the virtual character in an interactive virtual environment, such as a video game.

In another aspect, a computer program product tangibly embodied in an information carrier and comprising instructions that when executed by a processor perform a method that includes representing animation states of a virtual character in editable graphical representations. Each animation state represents each individual action of the character for an instance in time. The method also includes storing data that represents one or more changes in the animation states of the virtual character from the editable graphical representations. A pose of the virtual character is reconstructable upon retrieval of the stored data.

Implementations may include any or all of the following features. Instructions when executed by the processor may perform a method that includes comparing the editable graphical representations to determine the changes in the animation states of the virtual character. The animation states may represent actions performed by the virtual character at two or more time instances. Instructions when executed by the processor may perform a method that includes editing at least one of the editable graphical representations to change an action of the virtual character. Instructions when executed by the processor may perform a method that includes editing at least one of the editable graphical representations to add an action for the virtual character to perform. The editable graphical representations may be operator graphs. Each of the editable graphical representations may include a hierarchical structure that includes nodes that represent individual actions of the virtual character. The animation states may represent actions of the virtual character in an interactive virtual environment, such as a video game.

Details of one or more implementations are set forth in the accompanying drawings and the description below. Other features, aspects and advantages will be apparent from the description and drawings, and from the claims.

DETAILED DESCRIPTION

Figure 1:
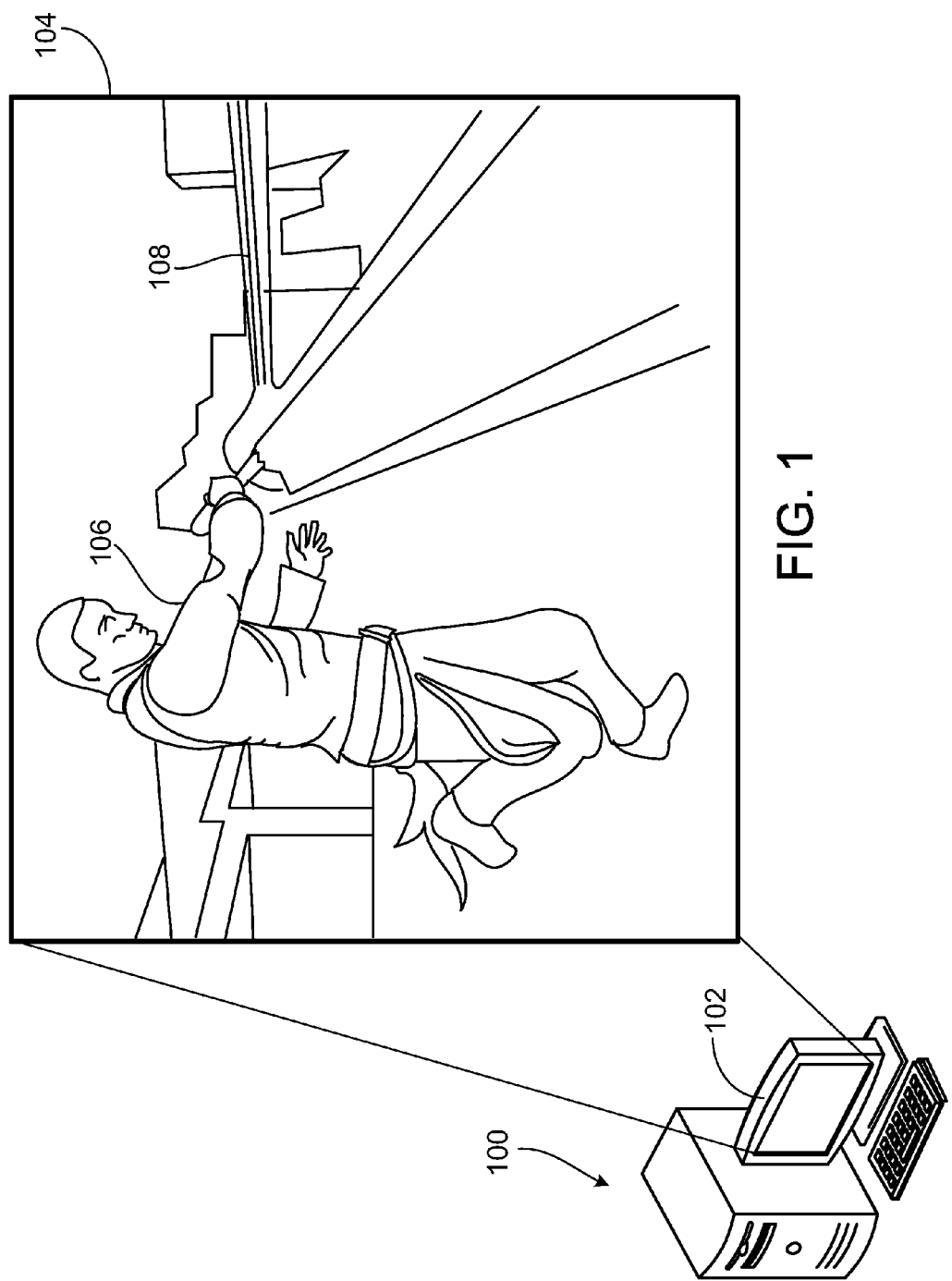
FIG. 1 illustrates an animated character in an interactive virtual environment.

Referring to FIG. 1, a computing device 100 (e.g., a computer system) is illustrated as presenting (on a display 102) a scene 104 of a virtual environment (e.g., a video game title) that provides a view of a virtual character 106 (e.g., included in the game). In this particular instance in time, the character is illustrated as transitioning from a standstill position into a running motion. At the same time, the character 106 has also raised its right forearm to deflect an incoming projectile (represented by the light beam 108). To animate such actions (e.g., starting to run from a standstill position, defensively raising an arm, etc.), a model is typically used by the video game title to dynamically construct the character and for each time instance to produce appropriate poses. Such character models can be complex and may utilize a number data sources to produce the needed poses. For example, the model may combine data from a number of animation clips (of the character) to produce poses that illustrate the character actions. Additional information may also be used for creating the poses, for example, one or more constraints (e.g., associated with the virtual environment) may need to be enforced by the model to produce the character poses. Since a considerable number of data sources may be used by the model, identifying the particular source (or sources) that cause the final on-screen character to appear visually incorrect or unrealistic (e.g., move awkwardly) can be a challenge. For example, a game developer may be unable to identify the defective data source just by reviewing the character pose (or poses) and may be forced to methodically review each data source used to create the pose(s). Furthermore, if an unrealistic movement is inadvertently noticed, the developer may have trouble recreating the character movement (e.g., unable to re-create the same game situation) for further study and analysis. As such, the developer may have difficulty reconstructing the subject movement of the character identify problem sources for corrective action. However, by providing a complete listing of each action that in combination creates a character pose (for each instance in time), a developer may be able to quickly identify and correct problems. Additionally, by allowing the action listing to be editable, the developer can adjust the actions while being provided context from the individual actions. Furthermore, once adjusted, the edited listing can be used to reconstruct the character to assure that proper poses are presented on-screen.

Figure 2:
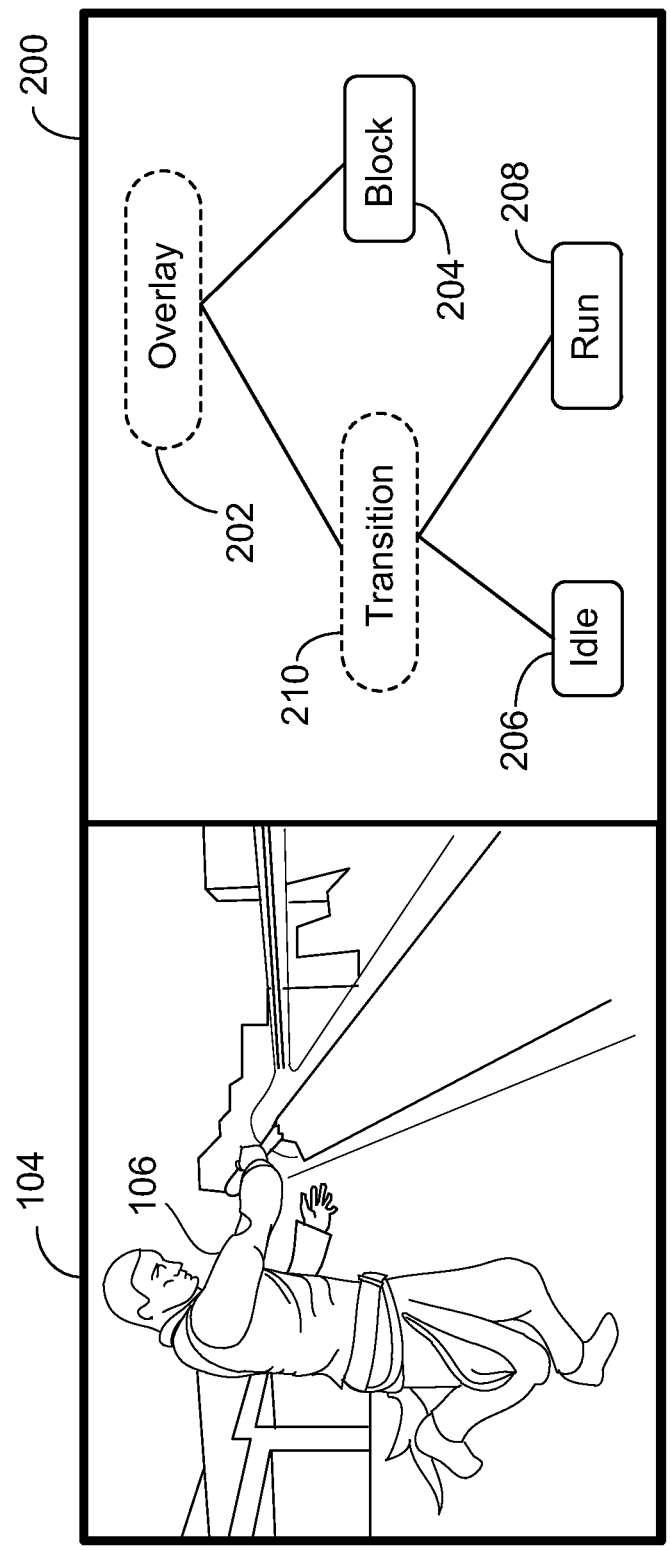
FIG. 2 illustrates a graphical representation of the animation state of the character.

Referring to FIG. 2, a graphical representation is illustrated that identifies the individual actions of the character 106 at the particular time instance illustrated in the scene 104. As such, the animation state of the character is graphically represented in a form that allows for relatively quick review by a developer along with editing content. By creating such a representation, the individual character actions can be quickly assessed for various types of analysis such as debugging the actions for visual glitches that may appear in the on-screen presentation of the character. Additionally, the graphical representation allows for the movement of the character to be reproduced (at a later time) that is faithful to the initial presentation of the character in action. Further, since the graphical representation is editable, character reconstruction can be considered more flexible compared to simply recording and re-playing the final character poses presented on-screen.

In this particular example, the graphical representation is depicted as an operator graph 200 that identifies each action of the character at a particular instance in time. Combined, the actions define the animation state of the character for this time instance. As such, by storing information representative of the operator graph 200 in a storage device (e.g., a hard drive, CD-ROM, memory, etc.), that graph can be reconstructed at a later time for playback of the character and corresponding movements (represented in the graph) or for further processing (e.g., introducing the character into another virtual environment, editing the actions, etc.). In this representation, the operator graph 200 provides a hierarchical structure that includes interconnecting nodes that represent individual actions of the character and for controlling the actions. In this arrangement, two types of nodes are included in the operator graph 200; nodes that define individual actions of the character and nodes for defining interactions of action nodes. For example, a node 202 (labeled "overlay") indicates that actions located in the hierarchical structure beneath this node 202 are to be executed in a simultaneous manner. As such, a node 204 that indicates the character perform a blocking maneuver (e.g., by raising its right forearm) is to be simultaneously executed with the character transitioning from an idle position (as indicated by a node 206) to running (as indicated by a node 208). To represent this transition (from the idle position to running), the operator graph also includes a node 210 (labeled "transition") that manages the transition between the two action nodes 206, 208.

In this illustrated example, the operator graph 200 represents the actions of the character 106 for one particular time instance. As time progresses, new actions may be performed by the character 106 based upon user input (e.g., instruct the character to pick up object), reaction to the virtual scene (e.g., a projectile collides with the character), etc. Correspondingly, the contents of the operator graph can change as time progresses. For example, new actions may be introduced while older actions fade out. Also, while an operator graph is used in this example to graphically represent the animation state of the character; one or more other types of graphical representations may be used for conveying such character information.

Figure 3:
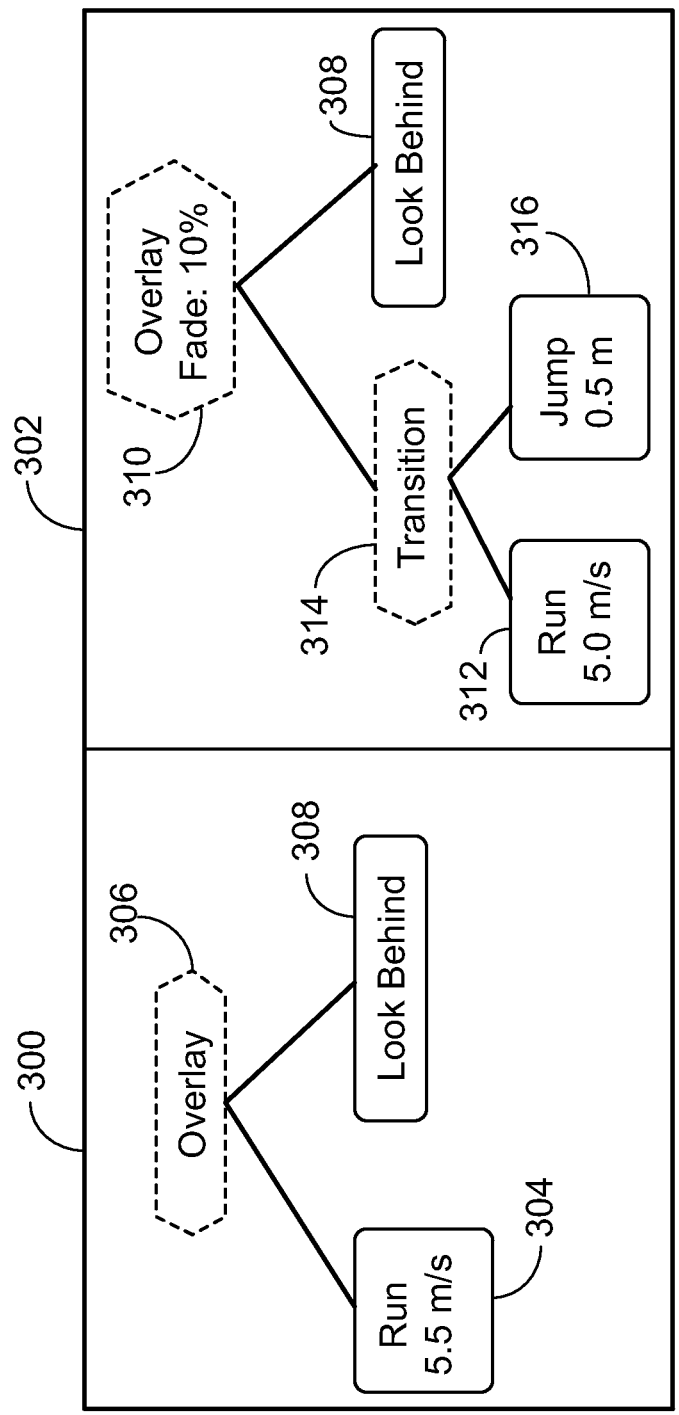
FIG. 3 illustrates two graphical representations that indicate changes in the animation state of a character.

Referring to FIG. 3, two operator graphs 300, 302 are illustrated that represent two sequential time instances. In operator graph 300, which corresponds to the earlier time instance, the character is running with a speed of 5.5 meters/second as represented by a node 304. Also during the same time instance, as represented by a node 306 (labeled "overlay"), the character is simultaneously looking behind itself, as represented by a node 308. In the next time instance, character actions have changed, as represented by the operator graph 302. For example, by introducing a fading attribute (represented in a node 310 labeled "overlay"), the backward looking action (represented by the node 308) fades and the character starts to look in the forward direction. Simultaneously (as also represented by the overlay node 310), the running speed of the character reduces by 0.5 meters/second (to 5.0 meters/second) as represented by a node 312. With the introduction of a transition node 314, the character also transitions from running into a jump action (to a height of 0.5 meters) as represented by a node 316. As such, along with graphically representing the animation states of each time instance, viewed together, a developer can quickly determine changes in the animation states (through visual inspection) as time progresses.

Along with providing the instantaneous pose of the character (for a particular time instance), the operator graph may describe the individual actions that influence the pose, attributes associated with each action (e.g., running speed, jump height, etc.) and the interaction among the actions (e.g., transitioning actions, overlaying actions, etc.). Conventional development systems tend to only store data that represents the final character poses for each frame (that are ready for on-screen viewing). As such, retrieving the recorded data typically only allows a developer to replay the character poses over the recorded time period and information associated with the underlying animation state of the character (for each frame) is not provided. However, by storing the information from the operator graphs (that represent character movements), the developer is provided the animation state of the character for one or multiple frames. Supplied with this information, a developer can quickly analyze the information provided by reconstructing the operator graphs, for example, to identify sources (e.g., an action, interacting actions, etc.) that may be causing the movement of the character to appear awkward or unrealistic. Once identified, the developer can edit the animation state of the character (e.g., add actions, delete actions, change action attributes, change the interaction of actions, etc.) represented in one or more of the operator graphs for corrective action.

To record the animation state information represented in operator graphs (or other graphical representations), one or more techniques may be implemented. For example, a computing device (e.g., computing device 100) can compare two operator graphs respectively constructed from two sequential time instances in a time period (e.g., a first and second frames of an animation) and determine topological changes (e.g., adding a node, removing a node, etc.) along with changes to attributes of individual nodes (e.g., increase running speed, transiting the character from looking backward to looking forward, etc.). Once compared, a list of the changes for these two operator graphs can be produced. For the next pair of sequential time instances (e.g., the second frame and a third frame of the animation), the corresponding operator graphs can be constructed and compared in a similar manner to identify changes in the operator graphs and create a list of the changes. In one arrangement, created lists may be combined (e.g., the second list appended to the first list). Sequentially stepping through the remaining pairs of time instances (e.g., frame pairs in the animation), changes can be similarly identified and listed based upon corresponding operator graphs. Identified and listed, the changes can be stored for later retrieval (e.g., to reconstruct associated operator graphs). By storing these listings of changes, more information is stored (e.g., the character animation state at each time instance) compared to just storing a representation of a final character pose for each frame. Additionally, once retrieved, the stored animation state information may be used to reconstruct the operator graphs and reproduce the character animation (represented by the animation states of the graphs). For example, listings of changes may be used (e.g., translated) to produce a list of frame-by-frame instructions (e.g., function calls) for an animation system (e.g., that may or may not include the computing device 100). In one arrangement, the frame-by-frame instructions may be provided to an application programming interface (API) of the animation system that would produce a substantially identical sequence of operator graphs (used to define the animation state of the character at each frame). In another arrangement, the retrieved listing of changes may be directly provided to the animation system API to reproduce the operator graphs.

The recorded animation state of each time instance (e.g., frame) may also be used for other applications. For example, the data may be used to reconstruct the character animation (from the stored sequence of movements) for presentation to a developer for debugging, refinement, etc. Once adjusted, e.g., by editing one or more appropriate operator graphs, the animation state for each frame may be stored again (for later use). The recorded animation states may also be used to incorporate the movements of the character into another performance or to transfer the movements to another character. For example, the stored animation states may be used to animate the character in a different virtual environment (e.g., another video game title). To store, retrieve and use the animation states of a character, the animation system may include one or more interfaces (e.g., displayed by the computing device 100) to provide a developer with efficient access and control of the information.

Figure 4:
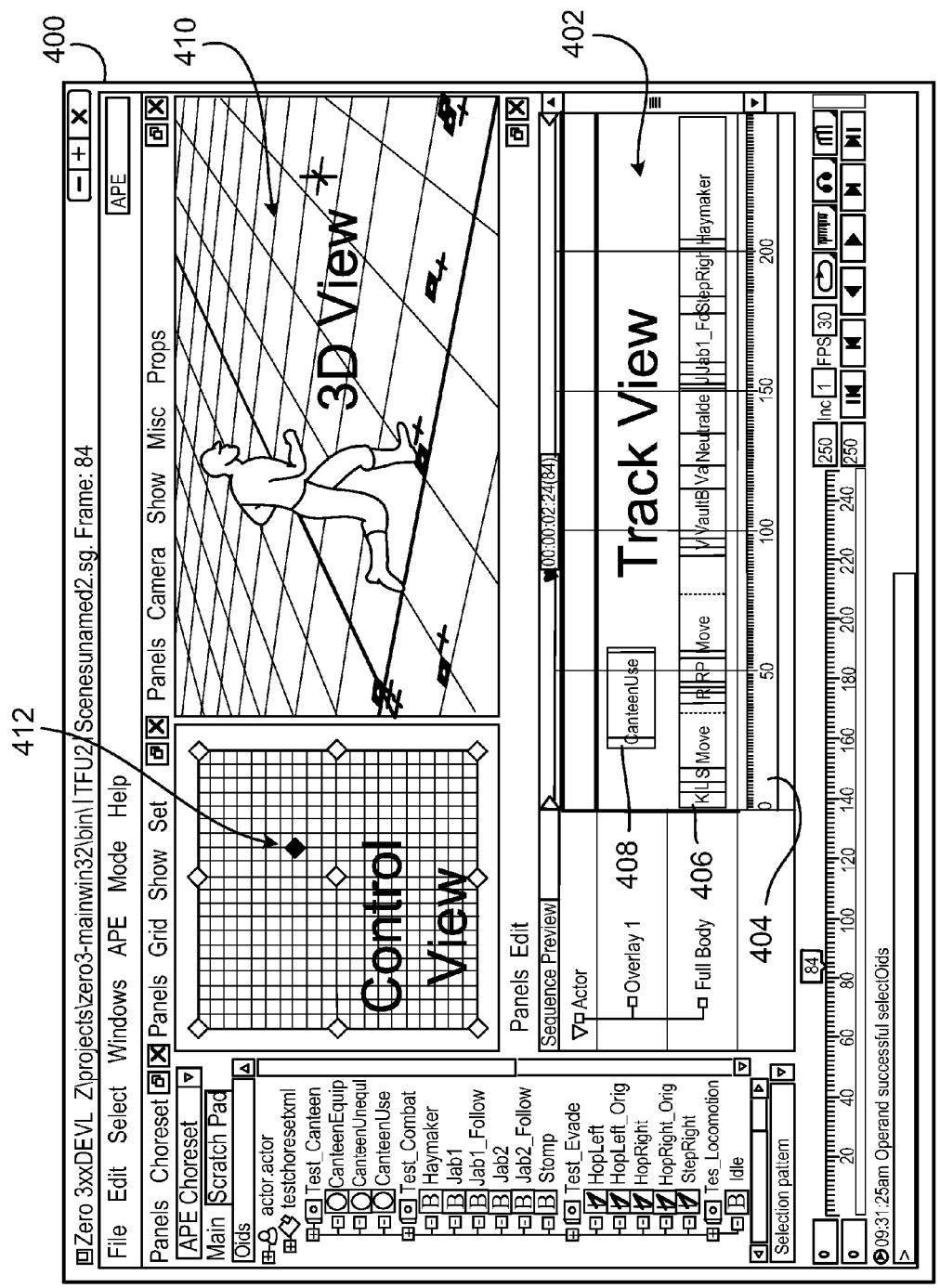
FIG. 4 is a user interface for reviewing, adjusting and reconstructing the animation state of a character.

Referring to FIG. 4, a user interface (UI) 400 is illustrated as may be presented by the display 102 of the computing device 100 or another type of computing device (e.g., included in an animation system). Along with allowing a developer to view a recorded sequence, the UI 400 allows for adjusting (e.g., debugging) the presented information. In this particular example, a track view 402 presents individual actions performed by a character as a function of time. As represented, the view provides a time line 404 that progresses from left to right and includes a graphical bar 406 that indicates a series of character actions (e.g., move in a particular direction, vault, throw a jab, throw a haymaker punch, etc.). Additionally, a second, but relatively shorter, graphical bar 408 represents that another action (e.g., the character using a canteen) simultaneously occurs during the same time period as some character movements represented by the graphical bar 406. The UI 400 also includes a three-dimensional (3D) view 410 of the character as rendered. From this portion of the UI 400, a developer can review the movements of character as would be provided to an end-viewer. This particular version of the UI 400 also includes a control view 412 that presents controls for one or more selected actions. Using this portion of the UI 400, a recorded sequence of character actions can be modified. For example, along with adjusting action attributes (e.g., increase running speed), the controls may be used to insert (or delete) one or more new actions. The control view 412 may also include other operations that may be initiated by a user. For example, once the recorded sequence has been appropriately modified, the user can replay the sequence (in the 3D view 410), import the sequence into a virtual environment (e.g., a video game title), or initiate other similar operations.

Figure 5:
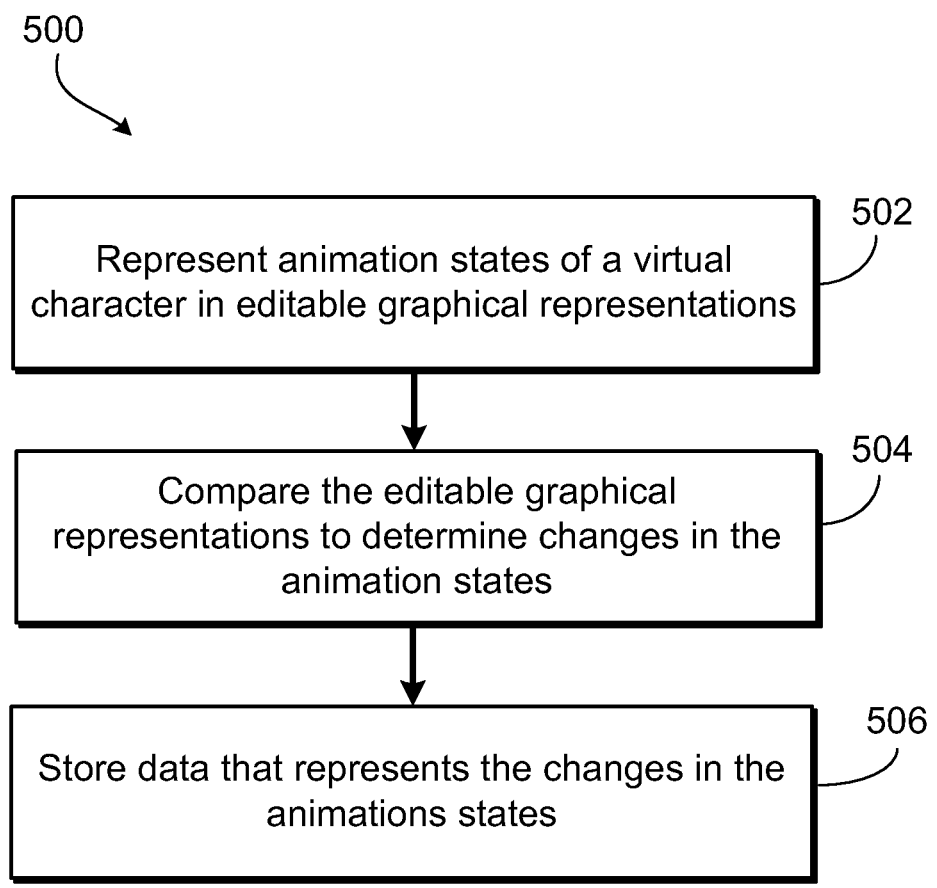
FIG. 5 is a flow chart of operations for using editable graphical representations to store the animation state of a character.

Referring to FIG. 5, a flowchart 500 represents operations of a computing device such as the computing device 100 to store data that represents changes in the animation state of a virtual character in an interactive virtual environment (e.g., a video game title) or other type of virtual scene (e.g., a scene of an animated motion picture). Such operations are typically executed by components (e.g., one or more processors) included in a computing device, however, operations may be executed by multiple computing devices. Along with being executed at a single site (e.g., at the location of the video game console), operations execution may be distributed among two or more locations.

Operations of the computer device may include representing 502 animation states of a virtual character in editable graphical representations. For example, for each time instance (or frame) for a period of time (or series of frames), an operator graph is constructed that represents the corresponding animation state of the virtual character. Operations may also include comparing 504 the editable graphical representations to determine changes in the animation states. For example, comparing the operator graphs for sequential pairs of time instances, changes in the animation states (e.g., character actions added, deleted, action attributes changed, etc.) may be identified. Operations may also include storing 506 data that represents the changes in the animation states as determined from the editable graphical representations (e.g., the operator graphs). Once stored, the data may be retrieved for reconstructing the operator graphs for further editing (e.g., adding action, deleting actions, changing attributes, etc.) or for playback of the virtual character animation for additional processing (e.g., debugging, importing to another virtual environment, etc.).

Figure 6:
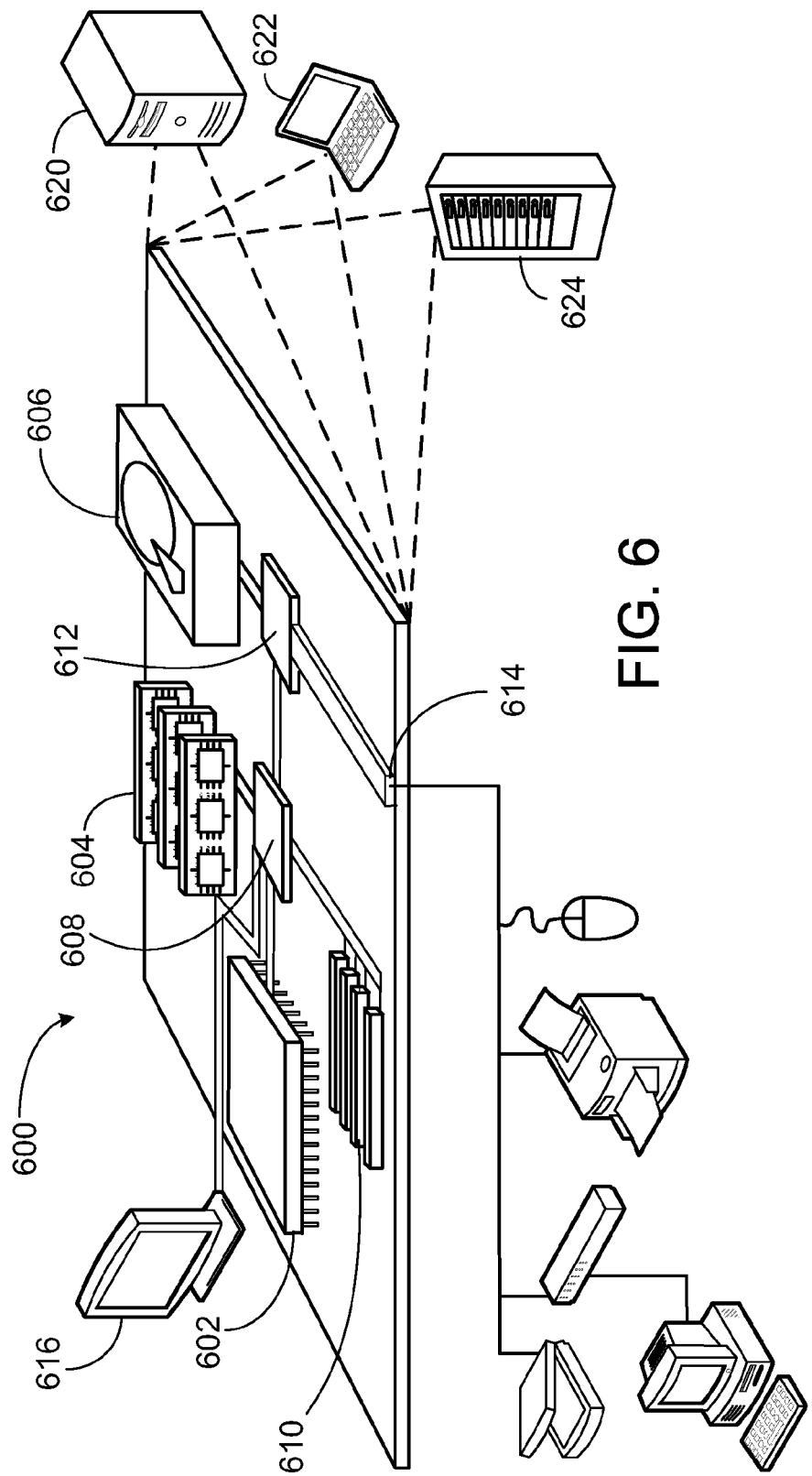
FIG. 6 is a block diagram of computing devices and systems.

FIG. 6 is a block diagram of computing devices that may be used and implemented to perform operations associated with representing animation states of a virtual character and storing the representations for later use. As such, the computing devices may provide operations similar to computer systems or other types of computing devices. Computing device 600 can also represent various forms of digital computers, such as laptops, desktops, workstations, personal digital assistants, servers, blade servers, mainframes, and other appropriate computers.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and can be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses can be used, as appropriate, along with multiple memories and types of memory. Also, multiple computing devices 600 can be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 can be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, memory on processor 602, or the like.

The high speed controller 608 manages bandwidth-intensive operations for the computing device 600, while the low speed controller 612 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which can accept various expansion cards (not shown). In the implementation, low-speed controller 612 is coupled to storage device 606 and low-speed expansion port 614. The low-speed expansion port, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 600 can be implemented in a number of different forms, as shown in the figure. For example, it can be implemented as a standard server 620, or multiple times in a group of such servers. It can also be implemented as part of a rack server system 624. In addition, it can be implemented in a personal computer such as a laptop computer 622. Alternatively, components from computing device 600 can be combined with other components in a mobile device (not shown).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
   receiving user input corresponding to one or more actions of a virtual character, the user input causing the virtual character to perform the one or more actions;
   representing animation states of the virtual character in editable graphical representations, wherein the one or more actions performed by the virtual character cause the editable graphical representations to be generated once the one or more actions have been performed, and wherein an animation state represents each individual action of the virtual character for an instance in time and an editable graphical representation of the animation state includes nodes that represent each individual action of the animation state; and
   storing data that represents one or more changes in the animation states of the virtual character from the editable graphical representations, wherein a pose of the virtual character is reconstructable upon retrieval of the stored data.

2. The computer-implemented method of claim 1, further comprising:
   comparing the editable graphical representations to determine the changes in the animation states of the virtual character.

3. The computer-implemented method of claim 1, in which the animation states represent actions performed by the virtual character at two or more time instances.

4. The computer-implemented method of claim 1, in which at least one of the editable graphical representations is editable to change an action of the virtual character.

5. The computer-implemented method of claim 1, in which at least one of the editable graphical representations is editable to add an action for the virtual character to perform.

6. The computer-implemented method of claim 1, in which the editable graphical representations are operator graphs.

7. The computer-implemented method of claim 1, in which each of the editable graphical representations include a hierarchical structure that includes nodes that represent individual actions of the virtual character.

8. The computer-implemented method of claim 1, in which the animation states represent actions of the virtual character in an interactive virtual environment.

9. The computer-implemented method of claim 1, in which the animation states represent actions of the virtual character in a video game.

10. A system comprising:
    a computing device comprising:
       a memory configured to store instructions; and
       a processor configured to execute the instructions to perform a method comprising:
          receiving user input corresponding to one or more actions of a virtual character, the user input causing the virtual character to perform the one or more actions;

representing animation states of the virtual character in editable graphical representations, wherein the one or more actions performed by the virtual character cause the editable graphical representations to be generated once the one or more actions have been performed, and wherein an animation state represents each individual action of the virtual character for an instance in time and an editable graphical representation of the animation state includes nodes that represent each individual action of the animation state; and storing data that represents one or more changes in the animation states of the virtual character from the editable graphical representations, wherein a pose of the virtual character is reconstructable upon retrieval of the stored data.

11. The system of claim 10, in which the processor is configured to compare the editable graphical representations to determine the changes in the animation states of the virtual character.

12. The system of claim 10, in which the animation states represent actions performed by the virtual character at two or more time instances.

13. The system of claim 10, in which at least one of the editable graphical representations is editable to change an action of the virtual character.

14. The system of claim 10, in which at least one of the editable graphical representations is editable to add an action for the virtual character to perform.

15. The system of claim 10, in which the editable graphical representations are operator graphs.

16. The system of claim 10, in which each of the editable graphical representations include a hierarchical structure that includes nodes that represent individual actions of the virtual character.

17. The system of claim 10, in which the animation states represent actions of the virtual character in an interactive virtual environment.

18. The system of claim 10, in which the animation states represent actions of the virtual character in a video game.

19. A computer program product tangibly embodied in a non-transitory information carrier and comprising instructions that when executed by a processor perform a method comprising:

receiving user input corresponding to one or more actions of a virtual character, the user input causing the virtual character to perform the one or more actions;

representing animation states of the virtual character in editable graphical representations, wherein the one or more actions performed by the virtual character cause the editable graphical representations to be generated once the one or more actions have been performed, and wherein an animation state represents each individual action of the virtual character for an instance in time and an editable graphical representation of the animation state includes nodes that represent each individual action of the animation state; and storing data that represents one or more changes in the animation states of the virtual character from the editable graphical representations, wherein a pose of the virtual character is reconstructable upon retrieval of the stored data.

20. The computer program product of claim 19, further comprising instructions when executed by the processor perform a method comprising:

comparing the editable graphical representations to determine the changes in the animation states of the virtual character.

21. The computer program product of claim 19, in which the animation states represent actions performed by the virtual character at two or more time instances.

22. The computer program product of claim 19, in which at least one of the editable graphical representations is editable to change an action of the virtual character.

23. The computer program product of claim 19, in which at least one of the editable graphical representations is editable to add an action for the virtual character to perform.

24. The computer program product of claim 19, in which the editable graphical representations are operator graphs.

25. The computer program product of claim 19, in which each of the editable graphical representations include a hierarchical structure that includes nodes that represent individual actions of the virtual character.

26. The computer program product of claim 19, in which the animation states represent actions of the virtual character in an interactive virtual environment.

27. The computer program product of claim 19, in which the animation states represent actions of the virtual character in a video game.

* * * * *